United States Patent Office 2,811,509

Patented Oct. 29, 1957

2,811,509

LIGHT-SENSITIVE POLYMERS FOR PHOTOGRAPHY

Donald A. Smith, Albert C. Smith, Jr., and Cornelius C. Unruh, Rochester, N. Y., assignors to Eastman Kodak Company, Rochester, N. Y., a corporation of New Jersey No Drawing. Application June 11, 1954, Serial No. 436,251

6 Claims. (Cl. 260—63)

This invention relates to light-sensitive copolymers containing recurring units having the probable general structure

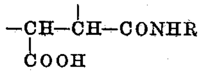

in which R represents one of the groups

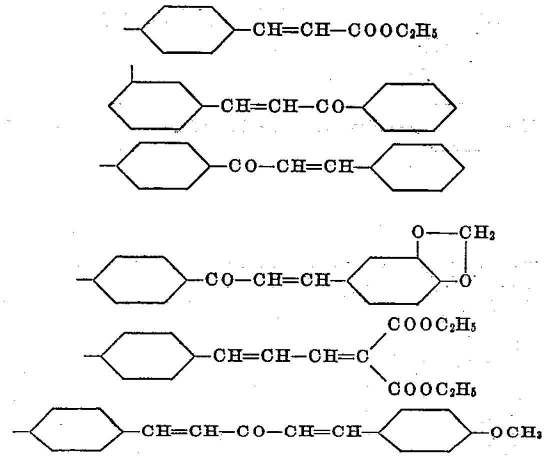

and

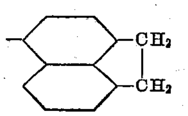

Particular features of our invention reside in copolymers containing recurring units having the probable general structures

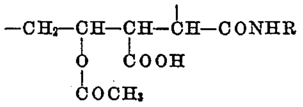

and

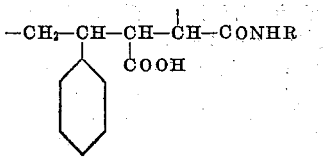

where R is as above-mentioned.

As will be apparent from the following examples, these polymers are prepared by reaction of a maleic anhydride copolymer preferably containing approximately equal molecular proportions of maleic anhydride units and a monomer polymerizable with maleic anhydride, with an aromatic amine such as m-aminobenzalacetophenone imparting the light-sensitive function to the polymer.

The comparative light sensitivity of the polymers is determined by exposing a layer of the polymer to actinic radiation such as a mercury vapor arc and observing the extent to which the polymer has been insolubilized in organic solvents in which the polymer was originally soluble. The light-sensitive polymers find particular use in photomechanical processes for the preparation of resist images. In this usage a supported layer of the polymer is exposed to a subject such as a line, halftone or continuous-tone image to render the polymer insoluble in the region of exposure following which the unexposed portion of the polymer layer is removed from the support by treatment with a suitable solvent. The resulting element comprising an insoluble polymeric relief image on the support is then utilized, for example, as a lithographic printing plate if the image has been prepared on a hydrophilic support such as grained zinc, surface-hydrolyzed cellulose ester, casein, etc. If the insoluble polymeric image has thus been prepared on a metal support such as zinc or copper plates, the usual etching solutions may be applied to obtain a relief printing plate.

The following examples illustrate the preparation of the polymers of the invention containing recurring units as indicated.

*Example 1*

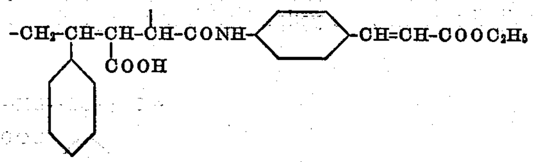

A solution of 2.0 g. of a styrene-maleic anhydride copolymer (1:1) in 20 ml. of dry pyridine was treated with 2.0 g. of ethyl 4-aminocinnamate in 10 ml. of pyridine. The solution was then heated 20 hours on the steam bath, cooled, and the product precipitated in dilute acetic acid. The fibrous precipitate was squeezed dry, dissolved in 20 ml. of acetone and precipitated in water. The purification was repeated once more yielding 3.5 g. of dried polymer.

Found: N=3.3%. Calculated: N=3.56%.

Exposure of a coating of this polymer through a photographic halftone negative using a source of ultraviolet light followed by development with methyl ethyl ketone yielded an insoluble polymeric relief image on the support.

*Example 2*

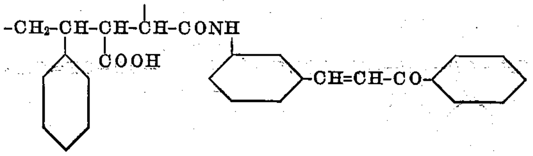

Two grams of the styrene-maleic anhydride copolymer was dissolved in 10 ml. of dry pyridine. To the solution was added a slurry of 4.5 g. of m-aminobenzalacetophenone (prepared according to Annalen, 441, p. 247) in 15 ml. of dry pyridine. The mixture was heated on the steam bath for 4 hours, diluted with an equal volume of acetone, and poured into a large excess of agitated dilute hydrochloric acid. The bright yellow precipitate was redissolved in a mixture of acetone and dioxane and again poured into distilled water containing a little hydrochloric acid. The polymer was reprecipitated a third time from dioxane solution into distilled water, washed well with distilled water, and dried at 40° C. Four grams of a friable yellow polymer were obtained which contained 4.1% nitrogen.

A coating of this polymer was made on a surface-hydrolyzed cellulose acetate sheet, and the coating was exposed through a negative to ultraviolet light. The exposed coating was developed with methyl ethyl ketone to give a relief image which corresponded to the image on the negative.

*Example 3*

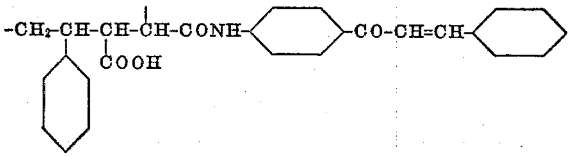

To a solution of 10 g. of the styrene-maleic anhydride copolymer in 90 g. dry pyridine was added 11 g. of 4'-amino chalcone (prepared according to the procedure given in the Journal of the Chemical Society, 1947, p. 1419). This solution was heated on the steam bath for 4 hours. The solution was cooled, diluted with an equal volume of acetone, and then poured into an agitated solution of 200 cc. of concentrated hydrochloric acid in 3 l. of distilled water. A yellow-brown fibrous product was obtained which was then thoroughly washed with distilled water and dried at 40° C. The polymer was redissolved in dioxane and reprecipitated into distilled water, leached in distilled water, and dried at 40° C. The yield was 17 g. The analysis was found to be: C=74.3, H=5.4, N=3.3. Calculated: C=76.2, H=5.4, N=3.3.

A coating of this polymer was made on a surface-hydrolyzed cellulose acetate sheet and exposed through a photographic negative to ultraviolet light. The exposed coating was developed in methyl ethyl ketone, and there was obtained an image of insolubilized polymer corresponding to that of the negative.

*Example 4*

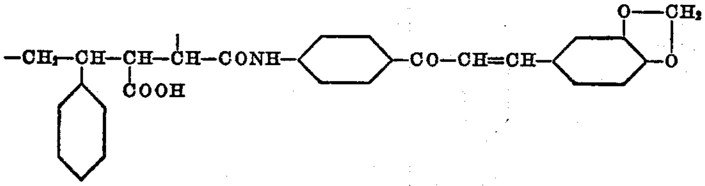

Fifteen grams of the styrene-maleic anhydride copolymer was dissolved in 135 ml. of dry pyridine. To this was added 20 g. of piperonal p-aminoacetophenone (prepared as described in Berichte, 37, p. 393) and the mixture heated on the steam bath for 4 hours. The red-brown solution was cooled and pored into 3 liters of distilled water containing 250 ml. of concentrated hydrochloric acid. The reddish-brown fibrous precipitate was washed well with distilled water and dried. The product was redissolved in acetone and filtered. The filtrate was poured into agitated distilled water and the brown, fibrous polymer was washed thoroughly in distilled water, and dried at 40° C. The yield was 25 g.

This material was subjected to the test for sensitivity to light described in Example 3 and readily gave an image of the insolubilized polymer.

*Example 5*

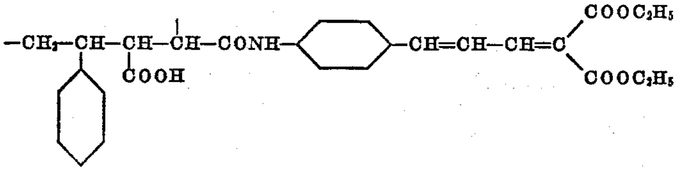

A solution of 5.8 g. of diethyl p-aminocinnamalmalonate in 5 ml. of dry pyridine was added to a solution of 4.0 g. of the styrene-maleic anhydride copolymer dissolved in 35 ml. of dry pyridine. This was heated on the steam bath for 1 hour, and the product was poured into an excess of agitated dilute acetic acid to give a red, gummy precipitate which was washed several times with dilute acetic acid. The product was dissolved in 70 ml. of acetone, filtered, and reprecipitated into dilute hydrochloric acid. The fibrous precipitate was well washed with distilled water and dried. The yield was 5.5 g. product which had a nitrogen content of 1.6%, denoting 36 mol percent reaction.

This product coated from methyl ethyl ketone, exposed to ultraviolet light through a photographic negative and then developed in methyl ethyl ketone gave an insoluble image.

*Example 6*

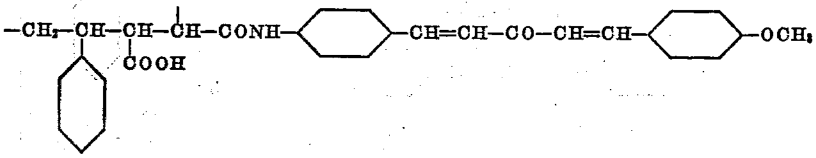

Two and nine-tenths grams of the styrene-maleic anhydride resin was dissolved in 30 cc. of dry pyridine at steam bath temperature. To this was added 1.0 g. (0.25 mole equiv.) of p-aminobenzalanisalacetone, and heating was continued.

After 4 hours the material was removed from the steam bath and diluted with 50 cc. of dioxane. The solution was poured slowly into a highly agitated mixture of 1.5 liters of water and 25 cc. of concentrated hydrochloric acid. A fine, orange-yellow precipitate was produced. This was isolated by filtration and air dried.

The product was dissolved in 75 cc. of dioxane and reprecipitated in 1.5 liters distilled water. After air drying the yield was 2.8 g.

*Analysis.*—Calc'd: N, 1.3. Found: N, 1.5.

A sample of this polymer subjected to the above test for light sensitivity when coated on a hydrolyzed cellulose acetate sheet had a speed of 25 compared to a speed of 2 for the light-sensitive polymer polyvinylcinnamate under the same conditions.

*Example 7*

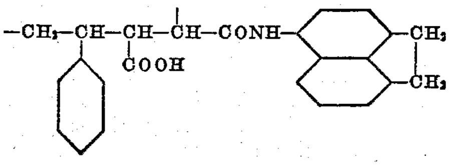

To 6.73 g. (0.033 mol) of the styrene-maleic anhydride resin dissolved in 50 ml. of hot, dry pyridine was added a solution of 5.63 g. (0.033 mol) of 5-aminoacenaphthene in 25 ml. of dry pyridine. A dark solution resulted.

The solution was refluxed for 1½ hours and then poured slowly into 1000 ml. of distilled water containing 100 ml. of acetic acid. The resulting tan, fibrous precipitate was washed in a mixture of 1000 ml. of distilled water and 100 ml. of acetic acid, then in three successive 1000 ml. distilled water washes. The product was air dried.

The dry product was dissolved in 200 ml. of dioxane and reprecipitated in water. It was again air dried.

*Analysis.*—Cal'cd for $C_{24}H_{21}O_3N$: C, 78.1; H, 5.2; N, 3.8. Found: C, 76.9; H, 5.5; N, 3.7

The polymer was found to be light-sensitive when tested according to the methods of the above examples.

*Example 8*

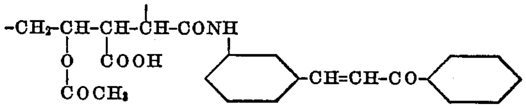

To a solution of 1.84 grams of a vinyl-acetate-maleic anhydride copolymer in 20 ml. of dry pyridine was added 2.5 grams of 3-aminobenzalacetophenone. The mixture was heated on the steam bath for two hours, then 2 ml. of water were added and the mixture heated a further ½ hour. The solution was then poured into a large volume of dilute hydrochloric acid, and the yellow-green fibrous polymer was thoroughly washed with distilled water, then dried at 40° C. The product weighed 3.6 grams and contained 4.3% nitrogen.

The polymer was coated on a surface-hydrolyzed cellulose acetate base from moist dioxane solution, and the coating was exposed to a source of ultra-violet light through a photographic half-tone negative. The exposed coating was developed in dioxane (containing a little water) and a positive image corresponding to the negative was visible on the surface.

Similar light-sensitive polymers are obtainable by reaction of the aromatic amines of the above examples with other copolymers of maleic anhydride such as with vinyl acetate, isopropenyl acetate, vinyl alkyl ethers, as vinyl ethyl ether, ethylene, acrylic and methacrylic acid esters and by reaction of the amines with polymers containing acyl halide groups such as homopolymers and copolymers of acrylyl or methacrylyl chloride or fumaryl chloride.

What we claim is:

1. A resinous copolymer containing recurring units of the class consisting of vinyl acetate and styrene units, and recurring units having the general structure:

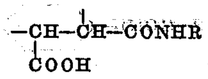

wherein R represents a substituent of the class consisting of

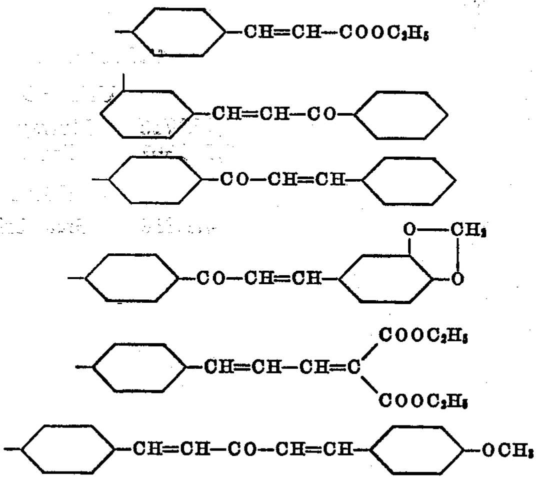

and

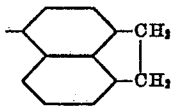

2. A resinous polymer containing recurring units having the structure:

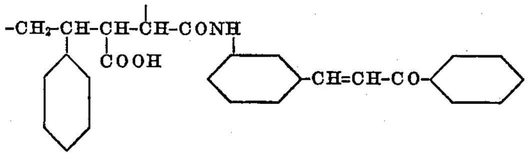

3. A resinous polymer containing recurring units having the structure:

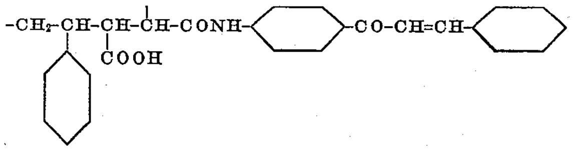

4. A resinous polymer containing recurring units having the structure:

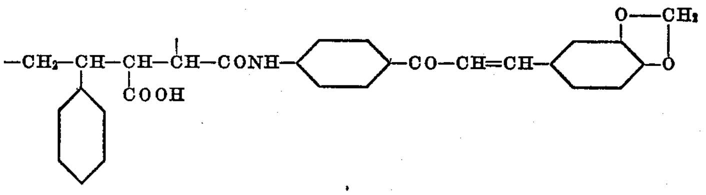

5. A resinous polymer containing recurring units having the structure:

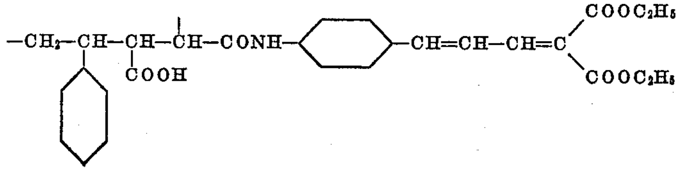

6. A resinous polymer containing recurring units having the structure:
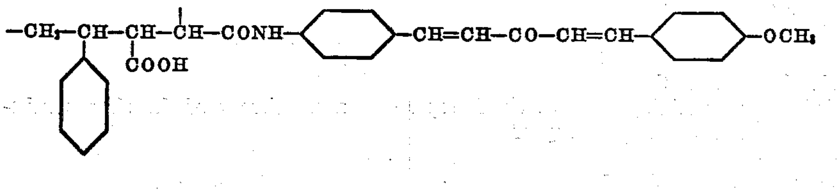
References Cited in the file of this patent
UNITED STATES PATENTS
| | | |
|---|---|---|
| 1,965,710 | Murray | July 10, 1934 |
| 2,566,302 | Allen | Sept. 4, 1951 |
FOREIGN PATENTS
| | | |
|---|---|---|
| 479,838 | Great Britain | Feb. 11, 1938 |